United States Patent Office 3,507,782
Patented Apr. 21, 1970

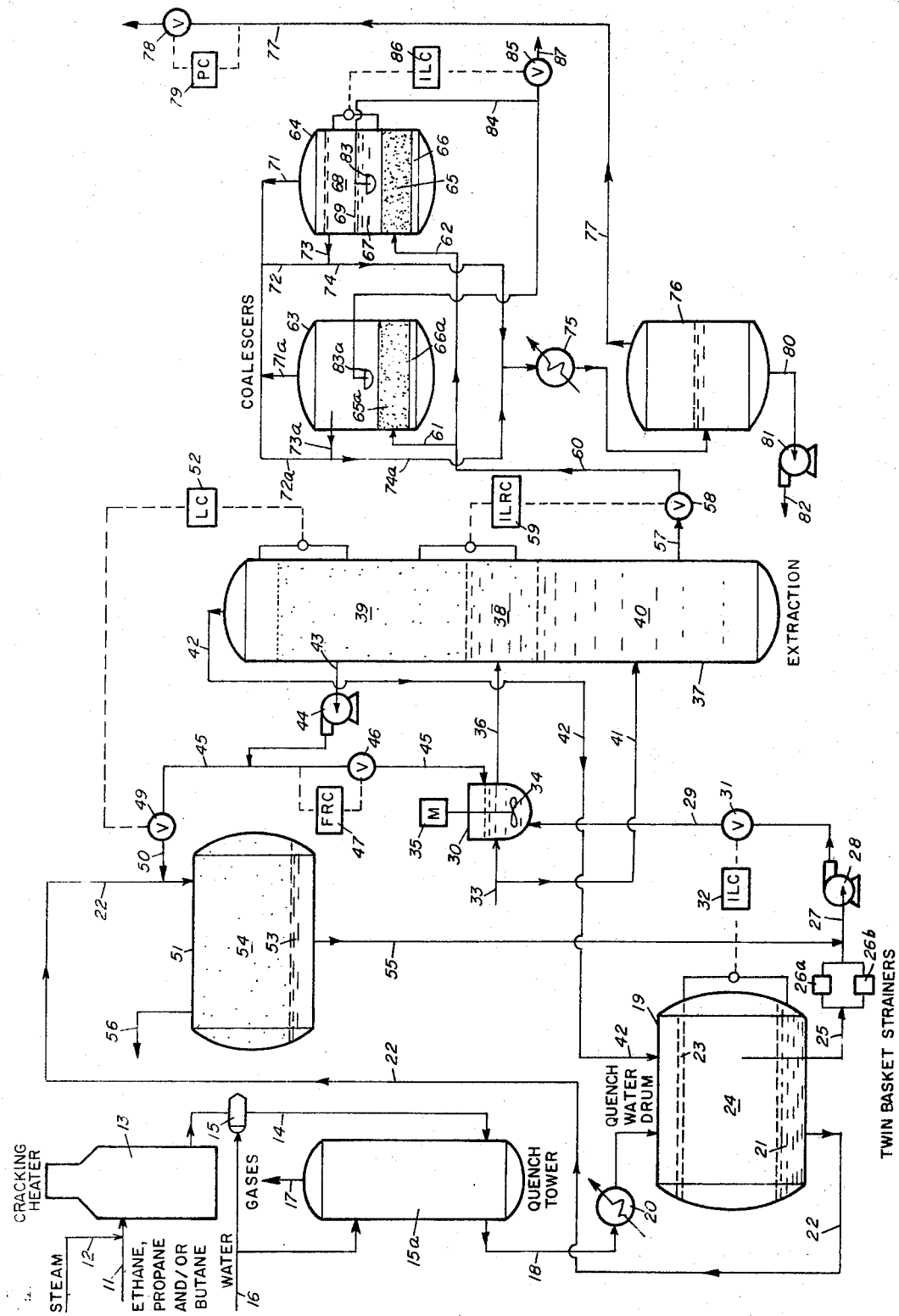

3,507,782
SEPARATION OF HYDROCARBONS FROM
PLANT PROCESS WASTE WATER
John R. Strausser and Ralph S. Kurland, Baytown, Tex.,
assignors to Gulf Oil Corporation, Pittsburgh, Pa., a
corporation of Pennsylvania
Filed Sept. 8, 1967, Ser. No. 666,309
Int. Cl. C10g 33/04; B01d 12/00
U.S. Cl. 208—188                                     11 Claims

ABSTRACT OF THE DISCLOSURE

The dispersed phase of stable emulsions comprising aromatic hydrocarbon-containing oils in aqueous media is demulsified by intimitely contacting the aqueous media with an aromatic hydrocarbon solvent, which results in an oil-rich solvent extract phase and an emulsified oil-depleted aqueous phase, and passing the oil-depleted aqueous phase, through a finely divided crystalline silica coalescing medium to demulsify the dispersed phase of the remaining emulsified oil.

---

This invention relates to a process for the separation of dissolved and emulsified hydrocarbons from aqueous media. More particularly, this invention relates to a process for the purification of plant process waste water and the recovery of the hydrocarbons entrained therein.

In the catalytic and thermal conversion of hydrocarbons, such as ethane, propane, and/or butane, naphthas, etc. under cracking conditions, the temperatures of conversion may range from about 800° F. up to about 1550° F. and higher. Temperatures of such magnitude are required in order to obtain desirable yields of ethylene, propylene, 1,3-butadiene, by-product aromatic distillates, etc. However, the low molecular weight products are reactive at high temperatures and will undergo further reaction to less desirable products unless the temperature is rapidly reduced to between about 50° and about 400° F. A suitable means of achieving the rapid temperature reduction is by injecting water directly into the hot effluent product gases from a plurality of spray nozzles in a quenching operation.

Water is highly suitable for quenching purposes since it is both effective and inexpensive. However, the employment of water in the quenching operation has one great attendant disadvantage. After treating the reaction effluent with the water, the quench medium contains significant amounts of dissolved and emulsified hydrocarbon oils, as well as heavy tar polymers and coke particles. The oils comprise aromatic hydrocarbons and light polymers. These materials form extremely stable oil-in-water emulsions when the cracked gas stream is intimately mixed with the quench water. The resulting emulsions comprise from about 2400 to more than about 6500 parts of the oil per million parts of the emulsion. The stability of the emulsion is apparently due, at least in part, to a mutual affinity between the dispersed oil phase and the continuous water phase. Thus, the emulsion will resist efforts to resolve it into its component parts.

These significant quantities of emulsified oils comprising aromatic hydrocarbons, and lesser amounts of olefinic hydrocarbons ordinarily require that the waste quench water be sewered, since it is undersirable to reuse this oil-contaminated water in plant processing operations. The oil content of this waste water is sufficiently high that it would adversely affect process equipment if it were used in high temperature heat exchange equipment, e.g. shell and tube heaters, etc. On the other hand, the discharge of waste quench water which contains heavy polymer tars, finely divided coke particles, and the hydrocarbon emulsions, into local streams can create a pollution problem, since sufficient impurities are present in the waste water to adversely affect fish and wildlife.

Accordingly, it would be desirable to purify this water to such an extent that it could be discharged into local streams without causing a pollution problem, or reused in process equipment. It would be further desirable to recover the dissolved and emulsified aromatic oils, since the aggregate of this material has many industrial and commercial applications. The aromatic and polymeric constituents might be individually recovered and employed as precursors for useful products, or the aggregate of the oil might be utilized, e.g. as a drying oil.

The use of chemical means for separating dissolved and emulsified hydrocarbons from aqueous media is undesirable, since it requires the employment of costly chemical reagents which may act as contaminants themselves either in the water or in the recovered oils.

The employment of simple gravity-type settling drums, commercial coalescers and filters for the separation of dissolved and emulsified hydrocarbons from aqueous media is undesirable and insufficiently effective in connection with emulsions of the presently described kind. Thus, such means involve high operating and maintenance costs. Additionally, the conventional gravity-type coalescers yield rather crude and inconsistent separations, since they perform best for separating less stable emulsions. Likewise, filter-coalescers of the commercial variety are expensive to operate.

This invention has for its object to provide a simple, efficient and economical process for the separation of emulsified and dissolved oils comprising aromatic and olefinic hydrocarbons from aqueous media.

Another object of this invention is to provide a process for the recovery of aromatic hydrocarbon-containing oils from large volumes of plant process waste water.

A still further object of this invention is to provide a process for the recovery of aromatic hydrocarbon-containing oils from water which had been previously employed in the direct quenching of a cracking operation effluent. Such operations are common to processes manufacturing olefins by pyrolysis of light hydrocarbons.

These and other objects are accomplished by the practice of this invention which, briefly, comprises intimately contacting aqueous media containing dissolved and emulsified oils with an aromatic hydrocarbon solvent under conditions so as to demulsify and extract a majority of the dissolved and emulsified hydrocarbons thereby forming an extract phase comprising the aromatic hydrocarbons solvent and the demulsified hydrocarbons, and subjecting a resulting aqueous raffinate phase to a treatment with a finely divided, crystalline silica coalescing medium so as to coalesce and agglomerate the remainder of the dissolved and emulsified hydrocarbons. The resulting aqueous phase is substantially hydrocarbon-free and may be reused in the various plant unit operations and processes or may be safely discharged into local waters. Likewise, the recovered hydrocarbon oils may be utilized as desired.

According to a preferred aspect of the present invention, a self-contained process is provided by employing a highly aromatic distillate fraction comprising benzene as the extractive solvent. Preferably, this fraction is a benzene-rich, cracked by-product from the olefin recovery section. In this manner, the process is not only simple and efficient, but it is also self-contained with the solvent being produced in the process.

It has been surprisingly found that the addition of the aromatic hydrocarbon solvent to the highly stable emulsion of the aromatic and olefin hydrocarbon-containing oil in aqueous media causes demulsification of the dispersed oil phase. Although it is not intended to limit the present invention to any particular theory, it appears that the aromatic hydrocarbon solvent changes the nature of the emulsion from that of good stability to poor stability by reducing the interfacial tension between the dispersed or discontinuous oil phase and the continuous aqueous phase. In this manner, the oil globules tend to agglomerate and coalesce. Upon settling, an aromatic solvent extract phase is formed which may be easily separated from the aqueous phase. The aqueous phase still contains a small portion of the emulsified hydrocarbon oil. By passage of this phase through a finely divided, crystalline silica coalescing medium, the remainder of the hydrocarbon dispersed phase is demulsified and separated from the aqueous media.

A preferred method of conducting the present invention will be illustrated by reference to the accompanying drawing.

Referring to the drawing, the gases to be cracked, such as ethane, propane, and/or butane, for example, are introduced into the system by a line 11, preferably at a temperature of about 60° to 300° F. Steam is introduced, if desired, by means of a line 12 along with the charge stock for the purpose of controlling the space velocity of the gases through the cracking heater 13 and to inhibit coking. Suitable amounts of steam include from about 10 to about 100 percent by weight based upon the gases introduced by means of the line 11. The gases are passed through the cracking heater 13 at a space velocity of between about 4,000 and about 14,000 pounds per square foot per hour for about 0.005 to about 0.025 minutes. A temperature of about 1400 to about 1550° F. is maintained in the cracking heater 13 by means not shown, and the pressure is in the range of between about atmospheric and about 50 pounds per square inch gauge.

A cracked gas mixture comprising $C_1$ to $C_6$ unsaturated hydrocarbons, such as ethylene, propylene, 1,3-butadiene, hydrogen, carbon dioxide and aromatic hydrocarbons comprising benzene, toluene, xylene and tars, is removed from the heater 13 by means of a line 14 and introduced into a prequench pot 15, and/or a quench tower 15a wherein it is cooled by cooling water in the form of a spray which is introduced therein by one or more lines 16. The cooling water is suitably at a temperature of between about 40° and about 450° F. Ordinarily, about 3 to about 30 parts of water per part of gas is sufficient to effect the desired cooling. So as to inhibit secondary reactions from arising within the cracked gas mixture, it is necessary that the cooling be effected in less than about 1 second.

Gaseous products of the cracking reaction including olefinic, saturated and aromatic hydrocarbons, hydrogen and carbon monoxide are cooled to a temperature of between about 50° and about 300° F. and are removed by means of a line 17 for subsequent processing. The cooling water contains the remainder of the hydrocarbons which are dissolved and entrained therein. The quench water stream is discharged from the quench tower 15 by means of a line 18 and is introduced into a quench water drum 19. The hydrocarbons are suspended in the quench water in the form of an emulsion. The quench water issuing from the quench tower 15 is at a temperature in the range of between about 100° and about 200° F. If desired, the temperature of the stream may be reduced in a cooler 20 so as to favor a physical separation of the tars from the quench water by gravity settling in the drum 19.

In the quench water drum 19 a heavy tar-water emulsion 21 collects at the bottom and is discharged from the drum 19 by means of a line 22. Some of the aromatic hydrocarbons in the quench water float to the top of the drum 19 and form a layer 23. Between the layers 21 and 23, forms an oily mixture of water, olefins, aromatics and lighter polymers having a density near that of water. Contained in the layer 24 is the stable emulsion which is to be treated by the process of this invention. The hydrocarbon oil content of the layer 24 may be, for example, in the range of between about 2000 and about 7000 parts per million.

The quench water of the layer 24 is discharged from the quench drum 19 by means of a line 25 through twin basket strainers 26a and 26b for the purpose of removing any suspended solid materials, e.g., carbon particles, from the waste quench water. Any suitable strainers or other filtering devices may be employed for this purpose. The waste quench water is passed from the strainers by means of a line 27 and a pump 28 into a line 29 by means of which the stream is introduced into an inline mixer 30.

The flow rate of quench water to the mixer 30 is regulated by means of a control valve 31 which is activated by an interface level controller 32 connected to the quench drum 19. The quench water stream in the line 29 may be introduced into the mixing vessel 30 at a temperature in the range of between about 140° and about 180° F.

Meanwhile, an aromatic hydrocarbon solvent, such as aromatic distillate having a boiling range between about 100° and about 350° F. and containing 40 to 70 percent by weight benzene is introduced by means of a line 33 into the mixer 30. Suitable aromatic hydrocarbon solvents include benzene, toluene, xylene, etc. or as previously mentioned, it is especially preferred to employ an aromatic distillate fraction that was produced in the cracking process as the solvent for the waste quench water. Thus, the solvent stream 33 may suitably be the benzene-rich fraction that is recovered from the cracked gases issuing from the quench tower 15 by means of the line 17. The olefinic and aromatic hydrocarbon recovery facilities (not shown) may include compression, absorption, stabilization, etc. operations. In this manner, the process of this aspect of the invention is wholly self-contained, and thereby no outside solvent is introduced which could dilute or contaminate the recovered hydrocarbons or add other pollutants to the water.

The aromatic hydrocarbon solvent and the waste quench water are thoroughly blended in the mixer 30 by means of an agitator 34 that is driven by a motor 35. The degree of mixing should be sufficient to enable the highly aromatic solvent to unify most of the aromatic, olefinic and polymeric materials in the quench water into a distillate fraction, but should not be so extensive as to homogenize or create a new and more stable emulsion. For example, the agitator may be suitably employed at a speed of about 1100 to 1200 revolutions per minute, while a contact time for liquid mixture may be in the range of between about 0.036 and about 0.042 minutes.

Although an agitated vessel is illustrated as the mixing device in the drawing, any suitable mechanical mixing device including an orifice-type mixer, etc., may be employed provided, as previously mentioned, the mixing obtained is not so extensive as to cause the formation of a stable emulsion. The mixture is discharge from the mixing device 30 by means of a line 36 whereby it is introduced into an extraction tower 37. In the extraction or de-oiling water tower 37, the mixture separates into a distillate layer and a water layer which are separated by a water-oil interface 38. Disposed above the interface 38 is the distillate layer 39 comprising the aromatic solvent and most of the aromatic hydrocarbons and low molecular weight polymers that were unified or agglomerated by the solvent. Below the water-oil interface layer 38 is the water layer 40 which is substantially depleted of emulsified hydrocarbons.

If desired, the extraction tower 37 may be provided with suitable means such as packing or trays which will aid in the resolution of the above-described layer. Suitable processing conditions which may be used in the extraction tower 37 include a top pressure in the range of between about 5 and about 100 p.s.i.g., preferably between about 15 and about 20 p.s.i.g. while employing a temperature in the range of between about 45° and about 200° F., preferably between about 140° and 160° F. The residence time for the quench water may suitably be in the range of between about 6 and about 60 minutes, preferably between about 32 and 45 minutes, while a water superficial velocity of between about 0.002 and 0.03 feet per second, preferably between about 0.011 and about 0.13 feet per second may be suitably employed.

Alternately, or in addition to the aromatic hydrocarbon solvent introduced into the mixer by means of line 33, fresh aromatic solvent may be sparged into a lower portion of the tower 37 by means of a line 41 which is positioned below the process line 36 which introduces the waste water.

Small amounts of vapor which are disengaged from the solvent and quench water in the top of the tower 37 are vented from the tower by means of a vent line 42. The vapor is then passed into the vapor space of the quench water drum 19.

Instead of employing a mixer-extraction tower combination as shown in the drawing, the aromatic hydrocarbon solvent and waste quench water may be intimately contacted in a continuous, countercurrent manner. According to this aspect of the invention, the solvent is continuously introduced into a lower portion of an extraction vessel, which may be similar in construction to the extraction tower 37. Meanwhile, the waste quench water is continuously introduced into an upper portion of the extraction tower. The tower is preferably provided with suitable packing or trays which permit a more intimate contact between the liquid phases. In this manner, a solvent extract stream is continuously removed from an upper portion of the tower while an extracted water stream is discharged from a lower portion of the tower. These streams may be then treated in the same manner as described herein for the corresponding streams removed from tower 37. If desired, continuous, countercurrent multiple-contact may be employed whereby more than one countercurrent extraction tower is employed.

Referring again to the drawing, a solvent extract or distillate stream is removed from the extraction tower 37 by means of a line 43 and a pump 44 from which it is introduced into a line 45. A portion of the solvent extract is recycled to the mixer 30 at a rate controlled by a valve 46 and a flow rate control assembly 47. A suitable ratio of quench water to the recycle solvent extract stream is in the range of between about 3 and about 40 volumes of quench water per volume of recycled solvent extract, preferably between about 15 and about 25 volumes per volume.

The make-up solvent which is introduced by means of the line 33 may be introduced into the mixer 30 at a rate corresponding to between about 1 and about 50 volumes of quench water per volume of make-up solvent, preferably between about 20 and about 30 volumes of quench water per volume of make-up solvent. The aromatic hydrocarbon solvent may be introduced into the mixture at a temperature in the range of between about 45° and about 120° F., preferably between about 70° and about 90° F. while at a specific gravity in the range of between about 0.600 and 0.900, preferably between about 0.750 and about 0.850 measured at 60° F./60° F.

The portion of the solvent extract in the line 45 which is not introduced into the mixer 30 is transferred by means of a valve 49, a line 50 and the line 22 into a tar settling drum 51. The discharge of the excess solvent and extract stream into the drum 51 is controlled by the level control system 52. Two individual layers are formed in the drum 51, which layers comprise a lower water layer 53 and an excess solvent extract layer 54. This layer also contains heavy tar that was removed from the quench water drum 19.

The heavy tar which is removed from the bottom of the drum 19 by means of the line 22 is absorbed from the tar-in-water emulsion with the water combined therewith by the solvent introduced by the line 50. The surplus solvent, extract, and extracted tar are sent to a storage tank, not shown, by means of the line 56. The specific gravity of the heavy tar is in the range of between about 1.00 and 1.05.

The tar settling drum 51 may be operated at a temperature in the range of between about 100° and about 200° F., preferably between about 140° and 160° F. The liquid residence time therein may be varied in the range of between about 15 and about 120 minutes, preferably between about 60 and 100 minutes. A suitable pressure is in the range of between about 10 and about 15 p.s.i.g., preferably about 12 p.s.i.g.

The water layer 53 is drawn off the bottom of the drum 51 and is then introduced by means of a line 55 into the process line 27 so as to become a part of the main waste quench water stream that is introduced into the mixer 30 for blending with the aromatic solvent. Other miscellaneous aromatic-laden waste waters from the cracking process may also be introduced into line 27 at this point.

An extracted water stream is removed from extraction tower 37 by means of a line 57 and a valve 58 at a rate controlled by the interface level rate controller 59. Thus, the liquid inventory in the tower 37 is maintained by the two controllers 52 and 59 which regulate the extract-solvent inventory and water discharge flow, respectively.

The extracted water from the tower 37 may be passed by means of the lines 60, 61 and 62 into the degasser-coalescers 63 and 64. As shown in the drawing, the coalescer 64 is in operation, while the coalescer 63 is a spare which may be employed in a standby position.

The extracted water which is removed from the lower portion of tower 37 has a greatly reduced hydrocarbon content as compared with the composition of the waste quench water that was withdrawn from the quench water drum 19. However, the extracted water in the line 60 is still not of a sufficient purity that it may be discharged into local waters or reused in various plant processing operations. Thus, according to the present invention, the extracted water is contacted with a coalescing medium comprising crystalline silica having a particle size in the range of between about 4 and about 100 mesh. This simple contacting results in a coalescing and agglomeration of the remaining dissolved and emulsified hydrocarbons and permits their removal from the quench water.

Referring again to the drawing, the extracted water in the line 60 is introduced upflow by means of the line 62 into the coalescer 64 where it contacts a bed of fairly high purity sand particles 65 having a particle size in the range of between about 4 and about 100 mesh, preferably between about 8 and about 20 mesh. The silica particles may be provided in a bed having a height in the range of between about 3 and about 4 feet, for example. A suitable support means such as a grid 66 is provided to hold the coalescing medium in place. The coalescer 64 may be suitably operated at a temperature in the range of between about 45° and about 180° F., preferably between 130° and about 150° F. while employing a top pressure in the range of between about 2 and about 25 p.s.i.g., preferably between about 15 and about 18 p.s.i.g.

The water to be purified may be introduced into the coalescer 64 at a superficial velocity in the range of between about 0.001 and about 0.015 feet per second, preferably between about 0.005 and about 0.013 feet per second. The coalescing medium may be employed in amounts sufficient to provide between about 0.9 and about 7.0 volumes of quench water per volume of coalescing medium per hour, preferably between about 4 and about 6 volumes per hour per volume. A residence time in the range of between about 6 and about 60 minutes, preferably between about 8 and about 16 minutes may be suitably employed in the coalescer.

A suitable coalescing system which may be employed in the process of the present invention is fully described in U.S. Patent application Ser. No. 592,459 which was filed on Nov. 7, 1966 in the name of Ffrench, Strausser and Thompson, the disclosure of which is hereby incorporated by reference. As described therein, the coalescing medium is crystalline silica of a fairly high purity and is preferably quartz. However, sand of a lower purity than quartz but without excessive organic materials, or other inert particles may be successfully employed.

The action of the coalescing medium causes the water and the oil to separate into layers 67 and 68, respectively. A water-oil interface 69 is therefore established above the sand bed 65.

Entrained gases are released by the action of the coalescing medium and are vented from the vessel 64 by means of a line 71. This gaseous stream is passed from the line 71 into a line 72 and is then combined with the separated oil from the layer 68 by means of a line 73. The combined stream is passed by means of the line 74 to a cooler 75 where the temperature may be reduced from between about 60° and about 100° F., preferably between about 60° and about 80° F. so as to cause the separation of non-condensible gases from the oil in the vessel 76 by means of a line 77 to a flare system (not shown) at a rate determined by the valve 78 which is activated by pressure control system 79. The oil that accumulates in the vessel 76 is discharged therefrom by means of the line 80 into the pump 81 and may be passed by means of the line 82 into the line 50 (by means not shown) for introduction into the tar settling drum 51. In this manner, all of the hydrocarbons that are recovered from the process of the present invention, including the solvent-extracted hydrocarbons and those coalesced from the quench water, are combined and transferred to a by-product storage tank (not shown).

The water in the layer 67 rises around a large dish shaped baffle 83, which causes the water to change its direction of flow. The water is thus drawn off by means of a line 84 and a valve 85 which is activated by an interface level controller 86. The water discharged by means of a line 87 has a hydrocarbon content in the range of between about 17 and about 45 p.p.m., so that over 99 percent by weight of oil which was originally present in the waste quench water is removed. Accordingly, the purified water may be discharged to local water streams or may be used in selected process operations of the olefin producing unit. The process of the present invention permits, for example, the purification of quench water, which has an emulsified oil content of 3125 and 6192 p.p.m., to high purity water streams containing 29 and 45 p.p.m. oil, respectively. Thus, a removal of over 99 percent by weight oil is obtainable.

The invention can be further illustrated by reference to the following example. Apparatus similar to that shown in the drawing is employed.

EXAMPLE

A charge comprising a gaseous mixture of ethane and propane is thermally cracked at a temperature above about 1450° F. and the cracked effluent gases are cooled to a temperature of 155° F. by means of a plurality of water jet sprays in a pre-quench pot and/or a quench tower. The waste quench water withdrawn from the quench tower is passed through a quench water drum in which a heavy tar-water emulsion collects below an oily mixture of water, aromatics, olefins and light polymers.

Waste quench water is withdrawn from the quench drum having an oil content of 6192 parts per million (measured as chloroform extractable material) and is passed to an in-line mixer where it is blended for a period of 2.5 seconds with a solvent having the following composition:

| | Percent by weight. |
|---|---|
| $C_5$, $C_6$ | 31.2 |
| Benzene | 41.2 |
| Toluene | 1.2 |
| $C_8+$ | 25.9 |

The blended mixture is passed to a lower portion of an extraction tower which is operated at the conditions shown in Table 1 below:

TABLE 1

| | Operating conditions |
|---|---|
| Top pressure, p.s.i.g. | 17.5 |
| Temperature, ° F. | 152 |
| Makeup (fresh) solvent temperature, ° F. | 85 |
| Make-up solvent specific gravity, 60° F./60° F. | 0.825 |
| Ratio of quench water-to-makeup solvent, vol./vol. | 28.8 |
| Ratio of quench water-to-makeup solvent, vol./tract, vol./vol. | 23.0 |
| Water superficial velocity, feet per second | 0.01 |
| Water residence time, minutes | 37.7 |

Extracted water is withdrawn from a lower portion of the extraction tower and is passed through a coalescer which is operated under the following conditions described in Table 2.

TABLE 2

| | Operating conditions |
|---|---|
| Top pressure, p.s.i.g. | 13.8 |
| Temperature, ° F. | 149 |
| Water superficial velocity | 0.005 |
| Water residence time, minutes | 13.9 |
| Ratio of quench water-to-coalescing medium vol./hr./vol. medium | 4.9 |
| Coalescing medium particle size, mesh range | 8–16 |

High purity sand is employed in the coalescer and above this layer of high purity sand forms a water layer below an oil layer. The oil is withdrawn from the coalescer and is passed to a cooler and then on to a settling tank from which non-condensible gases are released. The oil from the settling tank is passed to a tar settling drum after being combined with an excess solvent extract stream which is recovered from the extraction tower. The tar settling drum is operated at a pressure of 8 p.s.i.g., a temperature of 140° F. with a residence time of 69.0 minutes.

The combined stream of tar, solvent, extracted hydrocarbons and coalesced hydrocarbons are passed to a storage tank from which the individual hydrocarbon components may be recovered if desired, by conventional fractionation means.

Water having an oil content of 45 parts per million (measured as chloroform extractable material) is withdrawn from the water layer in the coalescer. Since more than 99 percent of the hydrocarbons have been removed, the water is of sufficient purity that it may be discharged into streams or other natural bodies of water. Likewise it may be reused in various plant operations such as feed water to a cracking furnace diluent stream generator, for circulation in cooling water systems or for prequench pot spray water, and the like.

Referring again to the drawing, many modifications may be made without departing from the spirit of the invention. For example, a plurality of mixers and/or extraction towers may be substituted for the single mixer 30 and extraction tower 37 shown in the drawing. Likewise, the recovered hydrocarbon oil and polymer tar may be subjected to additional separation into desired fractions by the use of such conventional means as distillation or extraction towers with auxiliary equipment, such as packing, reflux means and the like.

The above description and specific embodiments are intended to be only illustrative of a process which has been found to be highly advantageous for the treatment of process waste waters, which waters were formerly employed as a cracking diluent and in the direct quenching of cracked gases. However, the application of this invention is not intended to be limited in this regard and is equally applicable to the separation and recovery of aromatic hydrocarbons from aqueous media, regardless of the source. The term "aqueous media," as used in this specification, includes any non-oily liquid which is not soluble or miscible with oils.

We claim:

1. A process for the recovery of dissolved and emulsified aromatic hydrocarbon-containing oil from waste water which had been previously employed as a quench medium in direct contact with a cracked gas mixture which comprises intimately contacting said waste water with a solvent comprising an aromatic hydrocarbon to demulsify at least a portion of said media, separating said waste water into a solvent extract phase and an aqueous raffinate phase, passing said aqueous raffinate phase through a finely divided crystalline silica coalescing medium so as to demulsify substantially the remainder of said aromatic hydrocarbon-containing oil, and recovering said demulsified oil and substantially hydrocarbon-free waste water.

2. The process of claim 1 wherein the solvent is an aromatic by-product fraction of the cracked gas mixture.

3. The process of claim 2 wherein the solvent is an aromatic distillate fraction comprising benzene, toluene, and xylenes, with lesser amounts of olefins.

4. The process of claim 1 wherein the aqueous raffinate phase is contacted with finely divided crystalline silica having a particle size in the range of between about 8 and about 20 mesh.

5. The process of claim 1 wherein the solvent and impure aqueous media are contacted in a mixing zone and then passed into an extraction zone for the formation of the solvent extract phase and the aqueous raffinate phase.

6. The process of claim 5 wherein the mixture is heated to a temperature in the extraction zone in the range of between about 45° and about 200° F. for a period of between about 6 and about 60 minutes.

7. The process of claim 6 wherein between about 1 and about 50 volumes of impure aqueous media per volume of fresh aromatic hydrocarbon solvent are treated in the mixing zone.

8. The process of claim 7 wherein a portion of the solvent extract phase is withdrawn from the extraction zone and recycled to the mixing zone at a ratio of between about 3 and about 40 volumes of quench water per volume of solvent extract.

9. The process of claim 1 wherein the impure aqueous quench water is passed to a settling zone for removal of a heavy tar-water emulsion phase prior to intimately contacting the impure aqueous media with the aromatic hydrocarbon solvent.

10. The process of claim 1 wherein aromatic hydrocarbon solvent and impure aqueous media are intimately contacted in a continuous, countercurrent manner in an extraction zone.

11. A process for the recovery of dissolved and emulsified aromatic hydrocarbon-containing oil from waste quench water, which comprises subjecting at least one hydrocarbon selected from the group consisting of ethane, propane and butane to cracking conditions to obtain a cracked gas mixture comprising $C_1$ to $C_6$ saturated and unsaturated hydrocarbons, carbon dioxide, hydrogen and aromatic hydrocarbons, cooling the cracked gas with water to a temperature of between about 50° and about 400° F. in less than about one second, obtaining a gaseous product stream and a quench water stream comprising dissolved and emulsified aromatic hydrocarbon-containing oil, recovering a benzene-rich solvent fraction from said gaseous product stream, intimately contacting said benzene-rich solvent fraction and said quench water stream, forming a solvent extract stream and a demulsified aqueous raffinate stream, passing said raffinate stream through a finely divided crystalline silica, and withdrawing a substantially hydrocarbon-free aqueous stream.

References Cited

UNITED STATES PATENTS

| | | | |
|---|---|---|---|
| 1,480,091 | 1/1924 | Meredith | 210—23 |
| 1,944,479 | 1/1934 | Van Loenen | 210—23 |
| 2,785,120 | 3/1957 | Metcalf | 208—187 |
| 3,267,029 | 8/1966 | Campbell et al. | 210—23 |
| 2,073,248 | 3/1937 | Molinari | 210—21 |
| 2,588,794 | 3/1952 | Barton | 210—21 |
| 2,808,375 | 10/1957 | Manka | 210—21 |

DELBERT E. GANTZ, Primary Examiner

G. J. CRASANAKIS, Assistant Examiner

U.S. Cl. X.R.

23—21

PO-1050
(5/69)

UNITED STATES PATENT OFFICE
CERTIFICATE OF CORRECTION

Patent No. 3,507,782          Dated April 21, 1970

Inventor(s) John R. Strausser and Ralph S. Kurland

It is certified that error appears in the above-identified patent and that said Letters Patent are hereby corrected as shown below:

Col. 7, line 70, "31.2" should read --31.7--.

Col. 8, Table I, lines 10 and 11, "Ratio of quench water-to-makeup solvent, vol./ tract, vol./vol." should read --Ratio of quench water-to-recycle solvent and extract, vol./vol.--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents